US009815338B2

(12) United States Patent
Takahashi

(10) Patent No.: US 9,815,338 B2
(45) Date of Patent: Nov. 14, 2017

(54) TIRE FOR HEAVY LOADS

(71) Applicant: SUMITOMO RUBBER INDUSTRIES, LTD., Kobe-shi, Hyogo (JP)

(72) Inventor: Hiroki Takahashi, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 188 days.

(21) Appl. No.: 14/766,257

(22) PCT Filed: Jan. 14, 2014

(86) PCT No.: PCT/JP2014/050462
§ 371 (c)(1),
(2) Date: Aug. 6, 2015

(87) PCT Pub. No.: WO2014/122953
PCT Pub. Date: Aug. 14, 2014

(65) Prior Publication Data
US 2015/0367685 A1 Dec. 24, 2015

(30) Foreign Application Priority Data
Feb. 7, 2013 (JP) .................................. 2013-022542

(51) Int. Cl.
*B60C 1/00* (2006.01)
*B60C 13/00* (2006.01)
(Continued)

(52) U.S. Cl.
CPC ............ *B60C 13/00* (2013.01); *B60C 1/0025* (2013.01); *B60C 9/02* (2013.01); *B60C 9/18* (2013.01);
(Continued)

(58) Field of Classification Search
CPC ......... B60C 13/00; B60C 13/04; B60C 15/00; B60C 15/06; B60C 1/0025
See application file for complete search history.

(56) References Cited

U.S. PATENT DOCUMENTS 7,543,619 B2* 6/2009 Numata ................ B60C 1/0025
152/524
2007/0151649 A1 7/2007 Numata

FOREIGN PATENT DOCUMENTS

EP 2 657 049 A1 10/2013
JP 56-160203 * 12/1981
(Continued)

OTHER PUBLICATIONS

Extended European Search Report issued Sep. 13, 2016, in European Patent Application No. 14748860.5.
(Continued)

*Primary Examiner* — Justin Fischer
(74) *Attorney, Agent, or Firm* — Birch, Stewart, Kolasch & Birch, LLP

(57) ABSTRACT

To improve durability performance and rolling resistance performance in a well-balanced manner. It is a tire for heavy loads including a carcass ply (6A). A sidewall rubber (3G) includes an inside rubber part (15) on the carcass (6) side, and an outside rubber part (16) disposed on the outside thereof and forming a tire outer surface. The inside rubber part (15) has a loss tangent tan δ1 less than the outside rubber part (16), and their difference is 0.010 to 0.035. The inside rubber part (15) has a complex elastic modulus less than the outside rubber part (16), their difference is 0.5 to 1.4 (MPa). The outer end (15s) in the tire radial direction of the inside rubber part (15) contacts with the outer surface (2h) in the tire axial direction of the tread rubber (2G), and the inner end (15u) in the tire radial direction is disposed (Continued)

radially inside the outer end (6*e*) in the tire radial direction of the turned up portion (6*b*) of the carcass ply (6A).

8 Claims, 2 Drawing Sheets

(51) Int. Cl.
    *B60C 15/06*     (2006.01)
    *B60C 9/02*     (2006.01)
    *B60C 9/18*     (2006.01)
    *B60C 15/00*     (2006.01)
    *B60C 13/04*     (2006.01)

(52) U.S. Cl.
    CPC .......... *B60C 13/04* (2013.01); *B60C 15/0027* (2013.01); *B60C 15/0635* (2013.01); *B60C 2013/005* (2013.01); *B60C 2013/006* (2013.01); *B60C 2013/007* (2013.01); *B60C 2013/045* (2013.01); *B60C 2015/0621* (2013.01); *B60C 2015/0625* (2013.01); *B60C 2200/06* (2013.01)

(56) References Cited

FOREIGN PATENT DOCUMENTS

| | | |
|---|---|---|
| JP | 06-328912 A | 11/1994 |
| JP | 2007-196988 A | 8/2007 |
| JP | 2012-254736 A | 12/2012 |

OTHER PUBLICATIONS

International Search Report issued in PCT/JP2014/050462 dated Apr. 22, 2014.

* cited by examiner

TIRE FOR HEAVY LOADS

TECHNICAL FIELD

The present invention relates to a tire for heavy loads improved in durability performance and rolling resistance performance in a well-balanced manner.

BACKGROUND ART

In the following patent document 1, there is described a tire for heavy loads, wherein a sidewall rubber of a double structure is disposed in a sidewall portion. The sidewall rubber includes an inside rubber which is disposed in an inner side in the tire axial direction and whose loss tangent and complex elastic modulus are small, and an outside rubber which is disposed outside the inside rubber and whose loss tangent and complex elastic modulus are large.

In such tire for heavy loads, owing to the inside rubber, the energy loss in an inside part of the sidewall portion, where flexure is large during running, is decreased. Consequently, the rolling resistance performance becomes small.

Further, owing to the outside rubber, the weatherproof and resistance to external damage of an outside part of the sidewall portion can be prevented from deteriorating, and the durability performance is improved.

However, tires for heavy loads like this are required to be further improved in the rolling resistance performance and durability performance, responding to recent global environmental issues.

PRIOR ART DOCUMENT

Patent Document

Patent document 1: Japanese patent application publication 2007-196988

SUMMARY OF THE INVENTION

Problems to be Solved by the Invention

The present invention was made with the view to the above-mentioned actual circumstances, and a primary object is to provide a tire for heavy loads in which, essentially by constructing a sidewall rubber so as to include an inside rubber part on the carcass side and an outside rubber part disposed on the outside thereof, and defining their loss tangent and complex elastic moduli in relation to each other, the durability performance and rolling resistance performance are improved in a well-balanced manner.

Means of Solving the Problems

The present invention is a tire for heavy loads which has
a toroidal carcass extending from a tread portion through a sidewall portion to a bead core in a bead portion,
a belt layer disposed in the tread portion and outside the carcass in the tire radial direction,
a tread rubber forming an outer surface of the tread portion, and
a sidewall rubber extending inwardly and outwardly in the tire radial direction on the outer side in the tire axial direction of the carcass in the sidewall portion,
the carcass including a carcass ply including a main portion extending from the tread portion through the sidewall portion to the bead core in the bead portion, and a turned up portion continued from the main portion and turned up around the bead core from the inside to the outside in the tire axial direction,
and which is characterized in that
the sidewall rubber includes an inside rubber part on the carcass side, and an outside rubber part disposed on the outside thereof to form a tire outer surface,
the inside rubber part has a loss tangent (tan δ1) less than the outside rubber part and the difference is 0.010 to 0.035,
the inside rubber part has a complex elastic modulus less than the outside rubber part and the difference is 0.5 to 1.4 (MPa),
an outer end in the tire radial direction of the inside rubber part contacts with an outer surface in the tire axial direction of the tread rubber, and
an inner end in the tire radial direction of the inside rubber part is located on the inside in the tire radial direction of the outer end of the turned up portion of the carcass ply.

In the tire for heavy loads relating to the present invention, it is preferable that, in a tire meridian section including the tire rotational axis under a regular state of the tire mounted on a regular wheel rim, inflated to a regular inner pressure, and loaded with no load, the outer end in the tire radial direction of the turned up portion is located at a position of 5% to 17% of a tire section height from a bead base line.

In the tire for heavy loads relating to the present invention, it is preferable that a contact surface of the inside rubber part and the outside rubber part is extended inwardly in the tire radial direction from the outer end in the tire radial direction of the inside rubber part, and includes an arc-shaped inner arc surface being convex toward the inside in the tire axial direction, and an arc-shaped outer arc surface being convex toward the outside in the tire axial direction and continued from the inner arc surface through an inflection point, and
the thickness F1 in the tire axial direction of the outside rubber part at the inflection point is not less than 0.5 times the thickness F2 in the tire axial direction of a sidewall portion rubber at the inflection point.

In the tire for heavy loads relating to the present invention, it is preferable that the thickness J1 in the tire axial direction of the outside rubber part at the outer end in the tire radial direction of the turned up portion is not less than 0.5 times the thickness J2 in the tire axial direction of the sidewall rubber at the outer end.

In the tire for heavy loads relating to the present invention, it is preferable that the thickness C1 in the tire axial direction of the outside rubber part at a maximum tire section width position at which the carcass ply is located outermost in the tire axial direction is not less than 0.5 times the thickness C2 in the tire axial direction of the sidewall rubber at the maximum tire section width position.

Effects of the Invention

In the tire for heavy loads according to the present invention, the sidewall rubber includes the inside rubber part on the carcass side, and the outside rubber part disposed on the outside thereof and forming a tire outer surface.

The inside rubber part has the loss tangent (tan δ1) less than the outside rubber part, and their difference is 0.010 to 0.035. The inside rubber part has the complex elastic modulus less than the outside rubber part, and their difference is 0.5 to 1.4 (MPa).

In the tire for heavy loads according to the present invention, since rubber relatively small in the loss tangent and complex elastic modulus is disposed in the inside part of the sidewall portion where the flexion during running is large, heat generation and energy loss in the sidewall portion are reduced. Consequently, the rolling resistance performance of the tire is improved.

Since the outside rubber part is rubber whose loss tangent and complex elastic modulus are larger than the inside rubber part, the durability performance of the sidewall portion is maintained.

The inner end in the tire radial direction of the inside rubber part of the tire for heavy loads according to the present invention is positioned radially inside the outer end in the tire radial direction of the turned up portion of the carcass ply. Namely, the inside rubber part is disposed in a region where deformation is small during tire rolling. Therefore, the durability performance and the rolling resistance performance are improved.

The outer end in the tire radial direction of the inside rubber part contacts with the outer surface in the tire axial direction of the tread rubber. Thereby, the inside rubber part is disposed broadly toward the inside and outside in the tire radial direction, and a large rubber volume is secured by the inside rubber part.

Accordingly, the tire for heavy loads according to the present invention is improved in the durability performance and the rolling resistance performance in a well-balanced manner.

MODE FOR CARRYING OUT THE INVENTION

An embodiment of the present invention will now be described in conjunction with the accompanying drawings.

Figure 1:
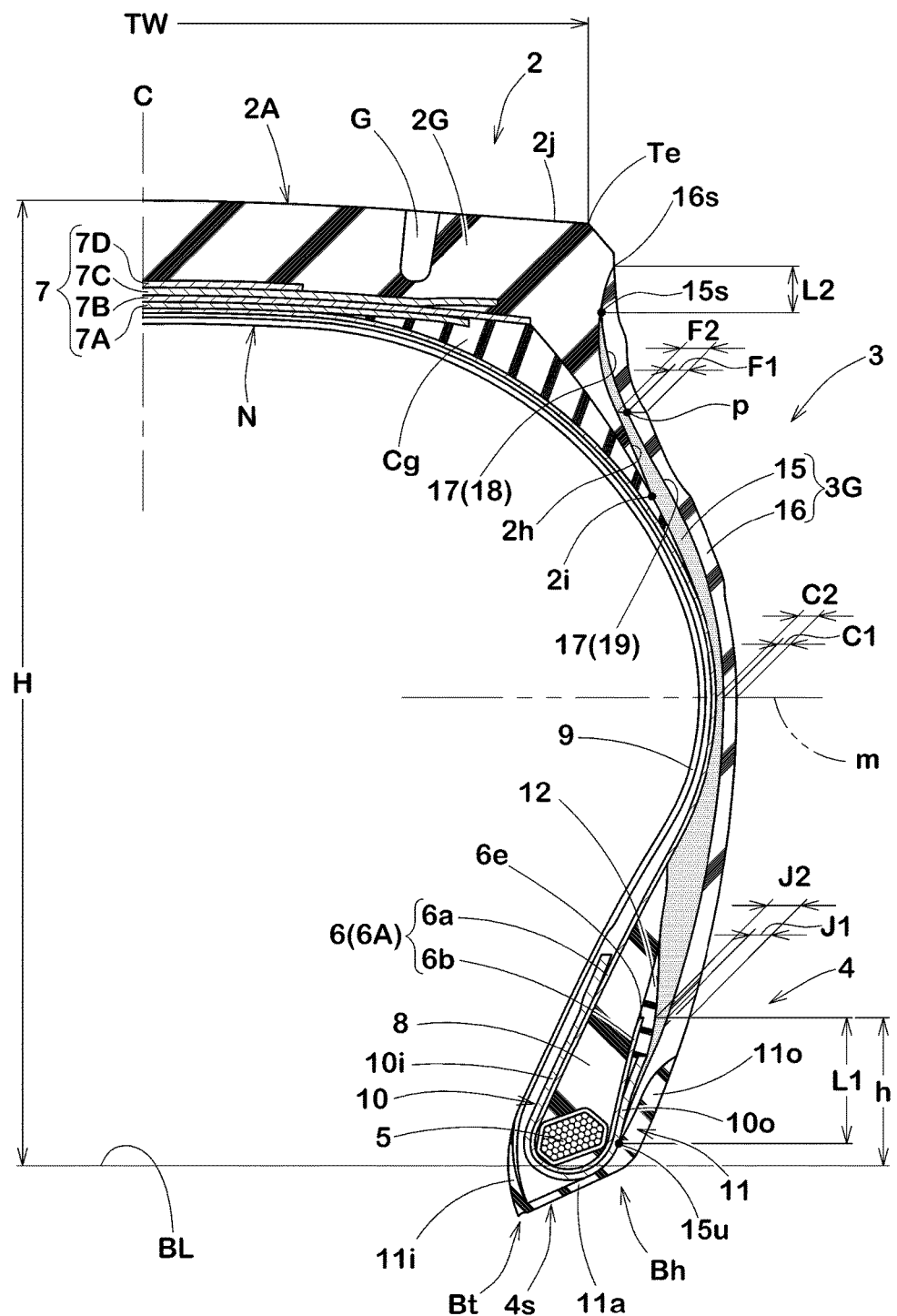
FIG. 1 a tire meridian cross sectional view showing a tire for heavy loads as an embodiment of the present invention.

FIG. 1 is a meridian section including the tire rotational axis (not shown) under the regular state of a pneumatic tire for heavy loads in this embodiment (hereinafter simply referred to as "tire" in some instances).

The tire in this embodiment is suitably used for truck, bus and the like for example.

The "regular state" is a state in which the tire 1 is mounted on a regular wheel rim (not shown), inflated to a regular inner pressure, and loaded with no load.

Unless otherwise noted, dimensions and the like of parts of the tire refer to values measured under the regular state.

The "regular wheel rim" is a wheel rim specified for the tire in a standard system including the specifications on which the tire is based, for example, the "normal wheel rim" in JATMA, "Design Rim" in TRA, "Measuring Rim" in ETRTO.

The "regular inner pressure" is air pressure specified for the tire in a standard system including the specifications on which the tire is based, for example, the "maximum air pressure" in JATMA, the maximum pressure specified in "TIRE LOAD LIMITS AT VARIOUS COLD INFLATION PRESSURES" in TRA, the "INFLATION PRESSURE" in ETRTO.

The tire 1 in this embodiment has a tread portion 2, a pair of sidewall portions 3 extending from both ends thereof in the tire axial direction toward the inside in the tire radial direction, and a bead portion 4 provided on the inside in the tire radial direction of each sidewall portion 3.

The tread portion 2 is arbitrarily provided with a groove G for drainage.

The tire 1 in this embodiment includes
a toroidal carcass 6 extending from the tread portion 2 through the sidewall portion 3 to a bead core 5 in the bead portion 4,
a belt layer 7 disposed in the tread portion 2 and outside the carcass 6 in the tire radial direction,
a tread rubber 2G forming an outer surface 2A of the tread portion 2, and
a sidewall rubber 3G extending inwardly and outwardly in the tire radial direction on the outside in the tire axial direction of the carcass 6 in the sidewall portion 3.

In this embodiment, the carcass 6 is formed by a single carcass ply 6A. The carcass ply 6A is a layer of carcass cords arranged at, for example, an angle of 75 to 90 degrees with respect to the tire circumferential direction. For example, the carcass ply 6A has a main portion 6a extending from the tread portion 2 through the sidewall portion 3 to the bead core 5 in the bead portion 4, and a turned up portion 6b continued from the main portion 6a and turned up around the bead core 5 from the inside to the outside in the tire axial direction.

Between the main portion 6a and the turned up portion 6b of the carcass ply 6A, there is disposed a bead apex rubber 8 extending outwardly in the tire radial direction from the bead core 5.

It is preferable that the outer end in the tire radial direction 6e of the turned up portion 6b of the carcass ply 6A is positioned in a range from 5% to 17% of a tire section height H from the bead base line BL.

If the height h of the outer end 6e of the turned up portion 6b from the bead base line BL exceeds 17% of the tire section height H, the weight of the tire increases, and there is a possibility that the rolling resistance performance is deteriorated.

If the height h of the outer end 6e of the turned up portion 6b is less than 5% of the tire section height H from the bead base line BL, the rigidity of the bead portion 4 decreases, and there is a possibility that durability performance is deteriorated. It is especially preferable that the height h of the outer end 6e of the turned up portion 6b is 7% to 15% of the tire section height H.

In this embodiment, the belt layer 7 is formed from a plurality of belt plies employing steel cords. The belt layer 7 includes a radially innermost first belt ply 7A of belt cords arranged at an angle of, for example, 60+/−15 degrees with respect to the tire equator C, and
second-fourth belt plies 7B, 7C and 7D of belt cords arranged at angles of, for example, 10 to 35 degrees with respect to the tire equator C.

The second-fourth belt plies 7B, 7C and 7D are overlapped so that the belt cords cross each other.

Between the second belt ply 7B and the carcass 6, cushion rubbers Cg having a substantially triangular sectional shape are disposed on both sides in the tire axial direction in order to complement the curvature difference between the belt layer 7 and the main portion 6a of the carcass ply 6A.

Further, the tire 1 in this embodiment includes
an inner liner rubber 9 made of air impermeable rubber and forming the tire inner surface N,
a bead reinforce cord layer 10 extending around the bead core 5 to have a substantially u-shaped cross section, and
a clinch rubber 11 disposed inside the sidewall rubber 3G in the tire radial direction.

The bead reinforce cord layer 10 is composed of a single ply of parallelly arranged steel cords or organic fiber cords, for example. The bead reinforce cord layer 10 includes an inside piece 10*i* extending along the inside in the tire axial direction of the main portion 6*a* of the carcass ply 6A, and an outside piece 10*o* continued from the inside piece 10*i* and extending along the outside in the tire axial direction of the turned up portion 6*b*.

The clinch rubber 11 is made of hard rubber and exposed in the bottom face 4*s* of the bead portion 4.

The clinch rubber 11 in this embodiment includes a base part 11*a* extending between a bead heel part Bh and a bead toe part Bt, an outer rising part 11*o* continued from an outside in the tire axial direction of the base part 11*a* and disposed on the outside in the tire axial direction of the outside piece 10*o*, and an inner rising part 11*i* continued from an inside in the tire axial direction of the base part 11*a* and disposed on the inside in the tire axial direction of the inside piece 10*i*.

In order to reinforce the clinch rubber 11, it may be possible to combine a rubber coated canvas material (not shown) and the like.

The tread rubber 2G in this embodiment has a ground contacting surface 2*j* extending inwardly in the tire axial direction from a ground contact edge Te and contacting with road surfaces, and an axially outer surface 2*h* extending inwardly in the tire radial direction from the ground contact edge Te.

In this embodiment, the inner end 2*i* in the tire radial direction of the outer surface 2*h* of the tread rubber 2G is positioned on the outer surface in the tire radial direction of the cushion rubber Cg.

Thereby, the cushion rubber Cg is reinforced, and durability performance is improved.

The tread rubber 2G may be constructed from a plurality of rubber layers (not shown) having different rubber hardnesses, for example, a cap rubber, a base rubber and the like.

In order to satisfy both of the durability performance and ride comfort, the complex elastic modulus of the tread rubber 2G is preferably 3.0 to 7.0 MPa.

From a similar standpoint, the loss tangent (tan $\delta$t) of the tread rubber 2G is preferably 0.050 to 0.150.

In this embodiment, the sidewall rubber 3G includes an inside rubber part 15 on its carcass 6 side, and an outside rubber part 16 disposed on the outside thereof and forming a tire outer surface.

This example is constructed by these two layers.

The inside rubber part 15 has a loss tangent (tan $\delta$1) less than the outside rubber part 16. The difference in the loss tangent between the inside rubber part 15 and the outside rubber part 16 is set to be 0.010 to 0.035.

The inside rubber part 15 has a complex elastic modulus E*1 less than the outside rubber part 16. The difference in the complex elastic modulus between the inside rubber part 15 and the outside rubber part 16 is set to be 0.5 to 1.4 (MPa).

In such tire 1, since rubber whose loss tangent and complex elastic modulus are relatively small is disposed in the inside part of the sidewall portion 3 whose flexion during running is large, the energy loss and heat generation in the sidewall portion 3 are reduced, and consequently, the rolling resistance performance is improved.

Since the outside rubber part 16 is rubber whose loss tangent and complex elastic modulus are relatively larger than the inside rubber part 15, the durability performance and weatherproof of the sidewall portion 3 are secured.

In this specification, the loss tangent and complex elastic modulus of rubber are indicated by values measured according to the provisions of JIS-K6394 under such conditions, temperature 70 deg. C., frequency 10 Hz, initial tensile distortion 10%, dynamic distortion's amplitude +/−2%, by the use of a viscoelastic spectrometer.

If the difference between the loss tangent (tan $\delta$2) of the outside rubber part 16 and the loss tangent (tan $\delta$1) of the inside rubber part 15 is less than 0.010, as the loss tangent values of the both parts become approached, there is a possibility that the durability performance of the outside rubber part 16 is deteriorated, or the lowered rolling resistance by the inside rubber part 15 is deteriorated. If the difference in the loss tangent exceeds 0.035, on the other hand, deformation is concentrated at the interface between the both rubber parts 15 and 16 to cause separation, and the durability performance of the sidewall rubber 3G is deteriorated. From this standpoint, the difference in the loss tangent between the outside rubber part 16 and the inside rubber part 15 is preferably not less than 0.015, more preferably not less than 0.020, and preferably not more than 0.030, more preferably not more than 0.025.

If the loss tangent (tan $\delta$1) of the inside rubber part 15 is large, there is a possibility that the heat generation and energy loss can not be fully reduced, and the above described effects are decreased.

If the loss tangent (tan $\delta$1) of the inside rubber part 15 is small, there is a possibility that the effect of the outside rubber part 16 to improve the durability performance can not be brought out.

From this standpoint, the loss tangent (tan $\delta$1) of the inside rubber part 15 is preferably not less than 0.030, more preferably not less than 0.040, and preferably not more than 0.075, more preferably not more than 0.060.

If the difference between the complex elastic modulus E*2 of the outside rubber part 16 and the complex elastic modulus E*1 of the inside rubber part 15 is less than 0.5 MPa, as the values of the complex elastic moduli of the both parts become approached, there is a possibility that the weatherproof of the outside rubber part 16 is deteriorated, or the lowered rolling resistance performance by the inside rubber part 15 is deteriorated.

If the difference in the complex elastic modulus between the two exceeds 1.4 MPa, on the other hand, distortion is concentrated at the interface between the rubber parts 15 and 16, and the durability performance of the sidewall rubber 3G is deteriorated. From this standpoint, the difference in the complex elastic modulus between the outside rubber part 16 and the inside rubber part 15 is preferably not less than 0.7 MPa, more preferably not less than 1.0 MPa, and preferably not more than 1.3 MPa, more preferably not more than 1.2 MPa.

If the complex elastic modulus E*1 of the inside rubber part 15 is high, there is a possibility that it becomes difficult to flexibly make bending deformation during running, the shock absorbing performance decreases, and the ride comfort is deteriorated.

If the complex elastic modulus E*1 of the inside rubber part 15 is low, there is a possibility that the rigidity of the sidewall portion 3 is greatly decreased, and the durability performance is deteriorated.

Therefore, the complex elastic modulus E*1 of the inside rubber part 15 is preferably not less than 2.0 MPa, more preferably not less than 2.5 MPa, and preferably not more than 3.5 MPa, more preferably not more than 3.0 MPa.

The inner end 15u in the tire radial direction of the inside rubber part 15 is located radially inside the outer end 6e of the turned up portion 6b of the carcass ply 6A.

The region where the turned up portion 6b is disposed has high rigidity, and the deformation during tire rolling becomes small. As the inside rubber part 15 is disposed in such position, the durability performance and the rolling resistance performance are improved.

The overlapping distance L1 in the tire radial direction between the inside rubber part 15 and the turned up portion 6b is preferably not less than 5%, more preferably not less than 7%, and preferably not more than 20%, more preferably not more than 18% of the tire section height H.

If the overlapping distance L1 is large, there is a possibility that the rigidity of the bead portion 4 is decreased.

If the overlapping distance L1 is small, there is a possibility that the effect to improve the rolling resistance performance can not be fully brought out.

The inside rubber part 15 is disposed outside the turned up portion 6b in the tire axial direction, therefore, separation and the like at the outer end 6e of the turned up portion 6b are prevented, and the durability performance is improved.

The inside rubber part 15 in this embodiment is formed between the outside rubber part 16 and a bead reinforcing rubber 12 disposed on the outer surface of the turned up portion 6b.

The outer end 15s in the tire radial direction of the inside rubber part 15 is connected to the outer surface 2h in the tire axial direction of the tread rubber 2G. The inside rubber part 15 disposed over a wide range in the tire radial direction has a large rubber volume. Further, as the inside rubber part 15 in this embodiment is sandwiched between the outside rubber part 16 and the tread rubber 2G, durability performance of the outside of the sidewall portion 3 in the tire radial direction is maintained at high level.

Since the inside rubber part 15 is prevented from being exposed in the tire outer surface, it is preferable that the distance L2 in the tire radial direction between the outer end 15s of the inside rubber part 15 and the outer end in the tire radial direction 16s of the outside rubber part 16 is not less than 5.0 mm, more preferably not less than 8.0 mm, and not more than 15.0 mm, more preferably not more than 10.0 mm.

In this embodiment, the contact surface 17 of the inside rubber part 15 and the outside rubber part 16 includes
an inner arc surface 18 extending inwardly in the tire radial direction from the outer end 15s in the tire radial direction of the inside rubber part 15 and being arc-shaped convexly toward the inside in the tire axial direction, and
an outer arc surface 19 connected to the inner arc surface 18 through an inflection point p and being arc-shaped convexly toward the outside in the tire axial direction.

The thickness F1 in the tire axial direction of the outside rubber part 16 at the inflection point p is preferably not less than 0.5 times the thickness F2 in the tire axial direction of the sidewall rubber 3G at the inflection point p.

The inflection point p is an outside region in the tire radial direction of the sidewall portion 3, and during cornering a large lateral force acts thereon.

If the thickness F1 of the outside rubber part 16 at the inflection point p is less than 0.5 times the thickness F2 of the sidewall rubber 3G at the inflection point p, there is a possibility that durability performance near the inflection point p is deteriorated.

On the other hand, if the thickness F1 of the outside rubber part 16 at the inflection point p is excessively large, there is a possibility that energy loss and heat generation at the inflection point p can not be fully reduced, and the rolling resistance performance is deteriorated.

Therefore, the thickness F1 of the outside rubber part 16 is more preferably not less than 0.55 times, and preferably not more than 0.7 times, more preferably not more than 0.65 times the thickness F2 of the sidewall rubber 3G.

At the position of the outer end 6e of the turned up portion 6b, a stepped rigidity difference is liable to occur.

At the maximum tire section width position m where the carcass ply 6A is positioned outermost in the tire axial direction, there is a tendency that the thickness of the sidewall rubber 3G is decreased in order to secure the ride comfort performance of the tire.

Therefore, it is preferable that the durability of the tire is secured by optimizing the thickness in the tire axial direction of the outside rubber part 16 at the outer end 6e of the turned up portion 6b and the maximum tire section width position m.

From this standpoint, the thickness J1 in the tire axial direction of the outside rubber part 16 at the outer end in the tire radial direction 6e of the turned up portion 6b is preferably not less than 0.5 times, more preferably not less than 0.55 times, and preferably not more than 0.7 times, more preferably not more than 0.65 times the thickness J2 in the tire axial direction of the sidewall rubber 3G at the outer end 6e of the turned up portion 6b.

The thickness C1 in the tire axial direction of the outside rubber part 16 at the maximum tire section width position m is preferably not less than 0.5 times, more preferably not less than 0.55 times, and preferably not more than 0.7 times, more preferably not more than 0.65 times the thickness C2 in the tire axial direction of the sidewall rubber 3G at the maximum tire section width position m.

While detailed description has been made of the pneumatic tire of the present invention, it is of course possible to carry out the present invention by modifying into various embodiments without being limited to the specific embodiment.

Embodiments

Figure 2:
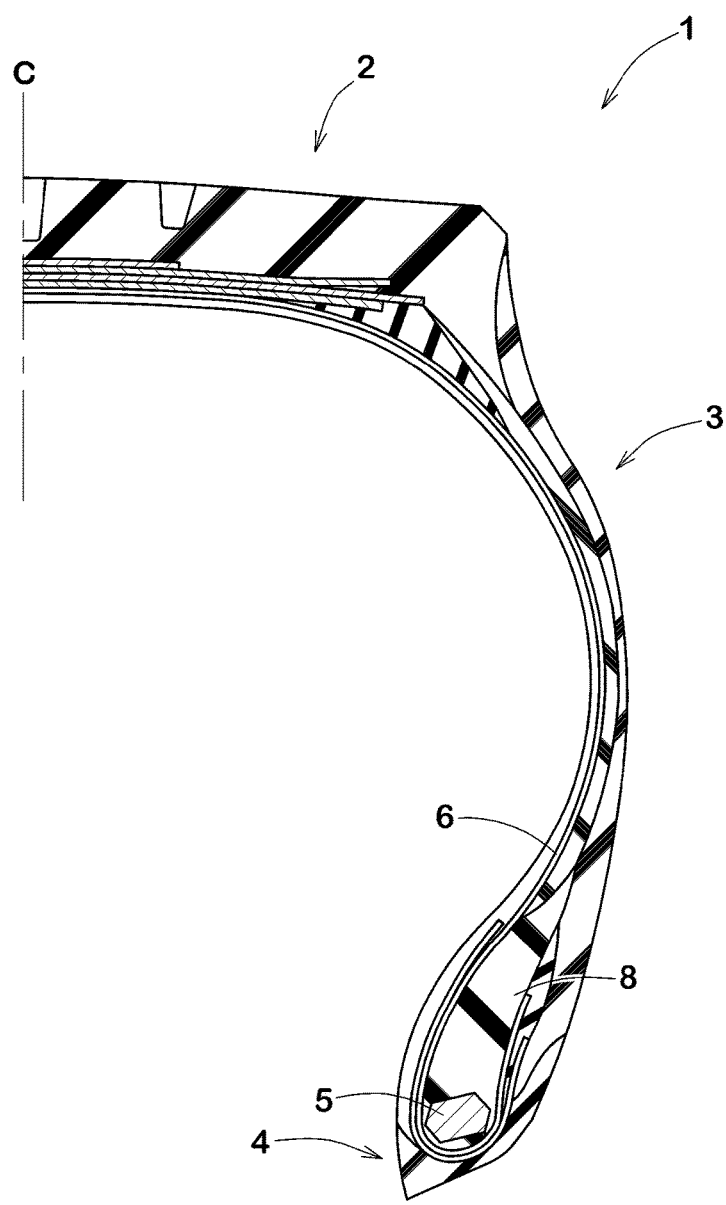
FIG. 2 a tire meridian cross sectional view showing a tire for heavy loads as comparative example 1.

11R22.5 14PR tires for heavy loads having the basic construction shown in FIG. 1 and FIG. 2 were experimentally manufactured according to specifications listed in Table 1.

The test tires were tested for the rolling resistance performance, durability performance and weatherproof. Common specifications to all test tires are as follows. Excepting Comparative example 1 in Table 1, arranged positions and the like of the rubber parts were as shown in FIG. 1.

Tread width TW: 235 mm

Tire section height H: 235 mm

Inside rubber part's loss tangent (tan δ1): 0.037

Inside rubber part7s loss tangent (tan δ1)<outside rubber part's loss tangent (tan δ2)

Inside rubber part's complex elastic modulus E*1: 4.0 MPa

Inside rubber part's loss tangent E*1<outside rubber part's loss tangent E*2

The test methods were as follows.

<Rolling Resistance Performance>

Using a drum type tire rolling resistance tester, the rolling resistance of each test tire was measured under the following conditions. The results are indicate by an index based on the comparative example 1 being 100. The smaller the value, the smaller or better the rolling resistance.

wheel rim: 7.50×22.5 inner pressure: 750 kPa load: 24.52 kN speed: 80 km/h

<Durability Performance>

Using a drum tester, each test tire was measured for the running time until cracks occurred in the bead portion under the following conditions. The evaluations are indicated by an index based on Comparative example 1 being 100. The larger the value, the better the performance.
  wheel rim: 8.25×22.5
  inner pressure: 1000 kPa
  load: 76.53 kN
  speed: 20 km/h <Weatherproof>

Each test tire was run for 600 hours while continuously spraying 40 degree Celsius, 50 pphm ozone onto the bead portion through a spray nozzle according to JIS K 6259 "Rubber, vulcanized or thermoplastics—Determination of ozone resistance". Then, carbon was applied to the cracks in the surface of the bead portion, and the cracks were checked for the number and the depth. The evaluations are indicated by an index based on Comparative example 1 being 100. The larger the value, the better the weatherproof (ozone durability performance).
  wheel rim: 7.50×22.5
  inner pressure: 800 kPa
  load: 22.72 kN
  speed: 80 km/h From the test results, it was confirmed that, in comparison with comparative example tires, the tires as Embodiments were improved in the rolling resistance performance, durability performance and weatherproof in a well-balanced manner. Through other tests made on different tire sizes, the same results were obtained.

DESCRIPTION OF THE SIGNS 2G tread rubber
2h outer surface of tread rubber
3G sidewall rubber
6 carcass
6A carcass ply
6b turned up portion of carcass ply
6e outer end of turned up portion
16 outside rubber part
15 inside rubber part
15u inner end of inside rubber part
15s outer end of inside rubber part

The invention claimed is:
1. A tire for heavy loads comprising:
   a toroidal carcass extending from a tread portion through a sidewall portion to a bead core in a bead portion,

TABLE 1

|  | comparative example 1 | comparative example 2 | comparative example 3 | comparative example 4 | comparative example 5 | Embodiment 1 | Embodiment 2 | Embodiment 3 | Embodiment 4 | Embodiment 5 | Embodiment 6 |
|---|---|---|---|---|---|---|---|---|---|---|---|
| figure showing tire structure | FIG. 2 | FIG. 1 | FIG. 1 | FIG. 1 | FIG. 1 | FIG. 1 | FIG. 1 | FIG. 1 | FIG. 1 | FIG. 1 | FIG. 1 |
| loss tangent difference *1 | 0.023 | 0.008 | 0.037 | 0.010 | 0.010 | 0.035 | 0.010 | 0.025 | 0.010 | 0.023 | 0.023 |
| complex elastic modulus difference *2 (MPa) | 1.0 | 0.5 | 0.5 | 0.4 | 1.6 | 1.4 | 1.4 | 1.4 | 0.5 | 1.0 | 1.0 |
| thickness ratio J1/J2 at outer end of turned up portion *3 (times) | 1.0 | 0.6 | 0.6 | 0.6 | 0.6 | 0.6 | 0.6 | 0.6 | 0.6 | 0.6 | 0.4 |
| thickness ratio C1/C2 at maximum tire section width position *3 (times) | 0.6 | 0.6 | 0.6 | 0.6 | 0.6 | 0.6 | 0.6 | 0.6 | 0.6 | 0.6 | 0.6 |
| thickness ratio F1/F2 at inflection point *3 (times) | 0.6 | 0.6 | 0.6 | 0.6 | 0.6 | 0.6 | 0.6 | 0.6 | 0.6 | 0.6 | 0.6 |
| rolling resistance performance [index, smaller value is better] | 100 | 110 | 85 | 108 | 108 | 88 | 101 | 90 | 103 | 90 | 85 |
| weatherproof [evaluation, larger value is better] | 100 | 100 | 100 | 100 | 100 | 100 | 100 | 100 | 100 | 100 | 98 |
| durability performance [index, larger value is better] | 100 | 90 | 93 | 95 | 102 | 105 | 105 | 105 | 108 | 110 | 103 |

|  | Embodiment 7 | Embodiment 8 | Embodiment 9 | Embodiment 10 | Embodiment 11 | Embodiment 12 | Embodiment 13 | Embodiment 14 | Embodiment 15 | Embodiment 16 | Embodiment 17 |
|---|---|---|---|---|---|---|---|---|---|---|---|
| figure showing tire structure | FIG. 1 | FIG. 1 | FIG. 1 | FIG. 1 | FIG. 1 | FIG. 1 | FIG. 1 | FIG. 1 | FIG. 1 | FIG. 1 | FIG. 1 |
| loss tangent difference *1 | 0.023 | 0.023 | 0.023 | 0.023 | 0.023 | 0.023 | 0.023 | 0.023 | 0.023 | 0.023 | 0.023 |
| complex elastic modulus difference*2 (MPa) | 1.0 | 1.0 | 1.0 | 1.0 | 1.0 | 1.0 | 1.0 | 1.0 | 1.0 | 1.0 | 1.0 |
| thickness ratio J1/J2 at outer end of turned up portion *3 (times) | 0.5 | 0.7 | 0.8 | 0.6 | 0.6 | 0.6 | 0.6 | 0.6 | 0.6 | 0.6 | 0.6 |
| thickness ratio C1/C2 at maximum tire section width position *3 (times) | 0.6 | 0.6 | 0.6 | 0.4 | 0.5 | 0.7 | 0.8 | 0.6 | 0.6 | 0.6 | 0.6 |
| thickness ratio F1/F2 at inflection point *3 (times) | 0.6 | 0.6 | 0.6 | 0.6 | 0.6 | 0.6 | 0.6 | 0.4 | 0.5 | 0.7 | 0.8 |
| rolling resistance performance [index, smaller value is better] | 88 | 92 | 96 | 89 | 90 | 92 | 94 | 88 | 89 | 92 | 94 |
| weatherproof [evaluation, larger value is better] | 100 | 100 | 100 | 95 | 98 | 102 | 104 | 95 | 98 | 102 | 104 |
| durability performance [index, larger value is better] | 105 | 112 | 114 | 110 | 110 | 110 | 110 | 110 | 110 | 110 | 110 |

*1: the difference between the loss tangent of the outside rubber part and the loss tangent of the inside rubber part.
*2: the difference between the complex elastic modulus of the outside rubber part and the complex elastic modulus of the inside rubber part.
*3: J1, C1 and F1 are the thicknesses in the tire axis direction of the outside rubber part at the respective positions. J2, C2 and F2 are the thicknesses in the tire axis direction of the sidewall rubber at the respective positions.

a belt layer disposed in the tread portion and outside the carcass in the tire radial direction, a tread rubber forming an outer surface of the tread portion, a sidewall rubber disposed on the outer side in the tire axial direction of the carcass in the sidewall portion, and a clinch rubber disposed in the bead portion and forming an outer surface of the bead portion, wherein the carcass comprises a carcass ply comprising:
   a main portion extending from the tread portion through the sidewall portion to the bead core in the bead portion, and
   a turned up portion continued from the main portion and turned up around the bead core from the inside to the outside in the tire axial direction, wherein the clinch rubber comprises:
   a base part extending between a bead heel part and a bead toe part, and
   an axially outer rising part extending radially outwardly from the base part, wherein the sidewall rubber includes:
   an inside rubber part on the carcass side, and
   an outside rubber part disposed on the outside thereof to form a tire outer surface, wherein the inside rubber part has a loss tangent (tan δ1) less than the outside rubber part and the difference therebetween is 0.010 to 0.035, wherein the inside rubber part has a complex elastic modulus less than the outside rubber part and the difference therebetween is 0.5 to 1.4 MPa, wherein an outer end in the tire radial direction of the outside rubber part contacts with an outer surface in the tire axial direction of the tread rubber, wherein an inner end in the tire radial direction of the outside rubber part contacts with an inner surface in the tire axial direction of the axially outer rising part of the clinch rubber, wherein an outer end in the tire radial direction of the inside rubber part contacts with said outer surface in the tire axial direction of the tread rubber, wherein an inner end in the tire radial direction of the inside rubber part is located on the inside in the tire radial direction of the outer end of the turned up portion of the carcass ply, and wherein the inner end in the tire radial direction of the outside rubber part and the inner end in the tire radial direction of the inside rubber part are disposed between the turned up portion of said carcass ply and the axially outer rising part of said clinch rubber.

2. The tire for heavy loads according to claim 1, wherein, in a tire meridian section including the tire rotational axis under a regular state of the tire mounted on a regular wheel rim, inflated to a regular inner pressure and loaded with no load, the outer end in the tire radial direction of the turned up portion is located at a position of 5% to 17% of a tire section height from a bead base line.

3. The tire for heavy loads according to claim 2, wherein a contact surface of the inside rubber part and the outside rubber part is extended inwardly in the tire radial direction from the outer end in the tire radial direction of the inside rubber part, and includes an arc-shaped inner arc surface being convex toward the inside in the tire axial direction, and an arc-shaped outer arc surface being convex toward the outside in the tire axial direction and continued from the inner arc surface through an inflection point, and the thickness F1 in the tire axial direction of the outside rubber part at the inflection point is not less than 0.5 times the thickness F2 in the tire axial direction of a sidewall portion rubber at the inflection point.

4. The tire for heavy loads according to claim 2, wherein the thickness J1 in the tire axial direction of the outside rubber part at the outer end in the tire radial direction of the turned up portion is not less than 0.5 times the thickness J2 in the tire axial direction of the sidewall rubber at the outer end.

5. The tire for heavy loads according to claim 2, wherein the thickness C1 in the tire axial direction of the outside rubber part at a maximum tire section width position at which the carcass ply is positioned outermost in the tire axial direction is not less than 0.5 times the thickness C2 in the tire axial direction of the sidewall rubber at the maximum tire section width position.

6. The tire for heavy loads according to claim 3, wherein the thickness J1 in the tire axial direction of the outside rubber part at the outer end in the tire radial direction of the turned up portion is not less than 0.5 times the thickness J2 in the tire axial direction of the sidewall rubber at the outer end.

7. The tire for heavy loads according to claim 3, wherein the thickness C1 in the tire axial direction of the outside rubber part at a maximum tire section width position at which the carcass ply is positioned outermost in the tire axial direction is not less than 0.5 times the thickness C2 in the tire axial direction of the sidewall rubber at the maximum tire section width position.

8. The tire for heavy loads according to claim 4, wherein the thickness C1 in the tire axial direction of the outside rubber part at a maximum tire section width position at which the carcass ply is positioned outermost in the tire axial direction is not less than 0.5 times the thickness C2 in the tire axial direction of the sidewall rubber at the maximum tire section width position.

* * * * *